United States Patent [19]

English

[11] Patent Number: 4,629,977

[45] Date of Patent: Dec. 16, 1986

[54] METHOD AND APPARATUS FOR MEASURING THE RESONANT FREQUENCY OF A HIGH Q RESONATOR

[75] Inventor: James D. English, Aloha, Oreg.

[73] Assignee: Tektronix, Inc., Beaverton, Oreg.

[21] Appl. No.: 740,365

[22] Filed: Jun. 3, 1985

[51] Int. Cl.⁴ ............................................. G01R 23/00
[52] U.S. Cl. .................... 324/81; 324/57 Q; 324/57 PS
[58] Field of Search ............ 324/57 PS, 57 Q, 58.5 C, 324/77 R, 76 R, 78 E, 78 F, 80, 81, 78 N, 78 R, 79 R, 79 D

[56] References Cited

U.S. PATENT DOCUMENTS 4,211,970  7/1980  Fitzky ........................... 324/58.5 C
4,447,782  5/1984  Rutkoski ........................ 324/79 R Primary Examiner—Michael J. Tokar
Attorney, Agent, or Firm—Allston L. Jones

[57] ABSTRACT

A resonator is initially charged by applying a drive signal offset from the expected resonant frequency of the resonator for a selected period of time. After the drive signal is removed from the resonator a period counter is used to count the period of the output signal of the resonator as it rings down. For low-Q resonators an amplifier is included to amplify the resonator output signal before being applied to the period counter to increase the number of cycles of that signal which are within the dynamic range of the period counter.

12 Claims, 2 Drawing Figures

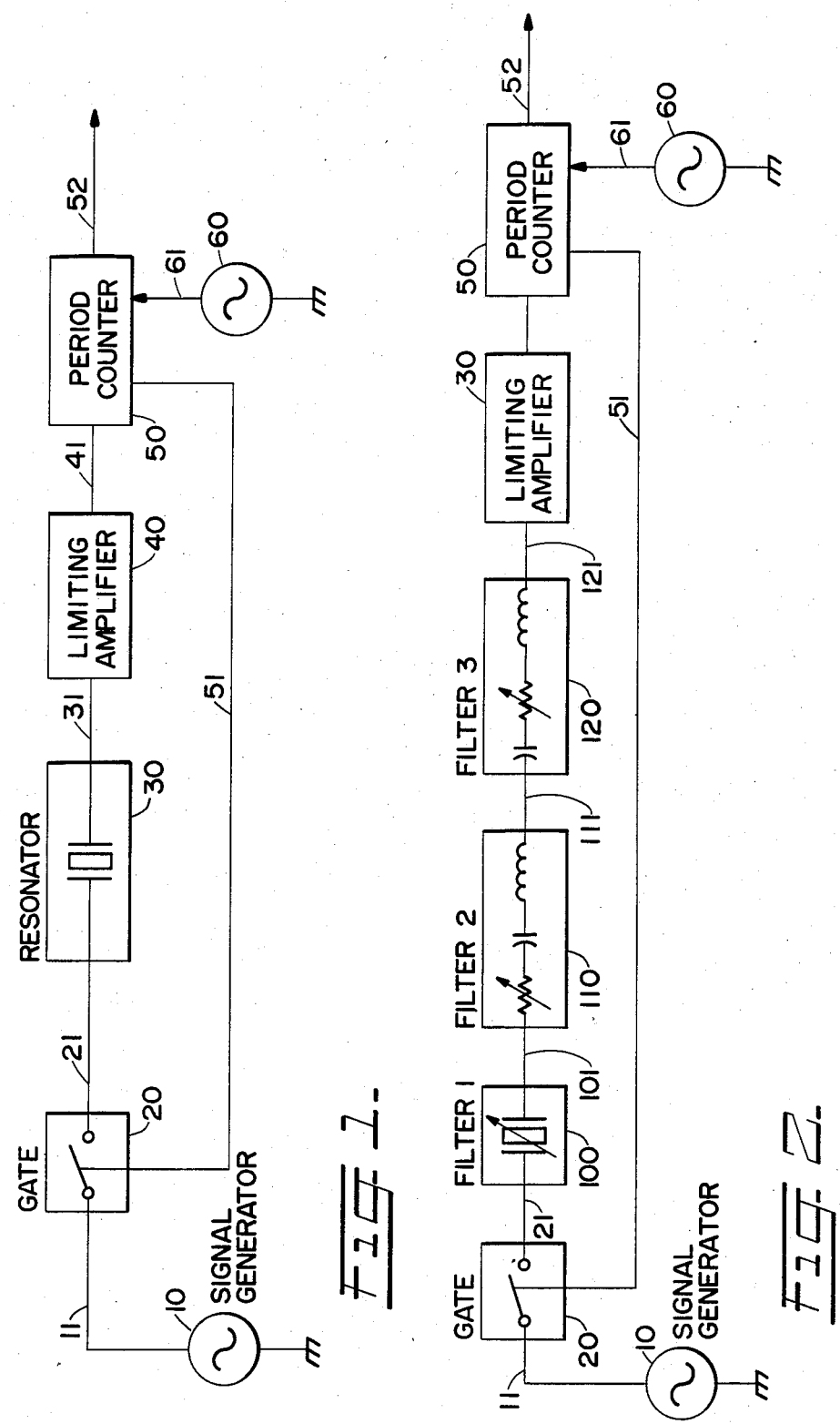

METHOD AND APPARATUS FOR MEASURING THE RESONANT FREQUENCY OF A HIGH Q RESONATOR

BACKGROUND OF THE INVENTION

Resonators are devices which have transfer characteristics allowing a very narrow frequency bandwidth signal to pass unattenuated. Typically, such devices are used extensively in tuning circuits for television and radio receivers, as filters in frequency/spectrum analyzers and in high precision oscillators.

In a very narrow bandwidth filter or resonator, such as those used in spectrum analyzers, it is necessary to determine the exact center frequency of the filter or resonator.

The method currently used to measure the center frequency of such as resonator is to drive the resonator with a signal of a constant amplitude and increasing frequency, also known as a sweeping signal. The output signal of the resonator is simultaneously measured. As the frequency of the sweeping signal approaches, passes throiugh, and goes beyond the center frequency of the resonator, the output signal grows, peaks and diminishes. The frequency at which the peak output is reached (i.e. point of minimum insertion loss) is labeled the center frequency.

This method is inadequate for an increasing number of commercial and scientific applications. Primarily, the method is inaccurate and time consuming. It is inaccurate in that the measurement is subjective. The peak signal level at the resonator output may appear to be any frequency of a band of frequencies in and around the actual resonant frequency. To increase the accuracy of that method, the measurement is repeated several times to obtain an average value. It is time consuming in that the frequency sweeping cannot be performed rapidly. If the sweep is too fast, the resonator has a tendency to ring thereby distorting the measurement. This coupled with the repetitions for accuracy further compounds measurement time delays.

It would be desirable to have a method and apparatus for rapidly measuring the resonant frequency of a narrow band resonator with a high degree of accuracy. The method and apparatus of the present invention achieves those desired results.

SUMMARY OF THE INVENTION

In accordance with the method and apparatus of the present invention, determination of the resonant frequency of a narrow band resonator is based on the dissipation of energy stored in the resonator. After a burst of energy of a single frequency near the resonance frequency of the resonator is applied to and stored in the resonator, the energy source (signal generator) is then disconnected and the resonator allowed to ring down. The resonator frequency is measured by a period counter driven by the output signal of the resonator. For very high-Q resonators, the time it takes for the output amplitude to decay, or ring down, is sufficiently long so that accurate measurements may be made without an amplifier. For lower-Q resonators, a limiting amplifier may be interposed between the resonator output terminal and the period counter so that additional cycles of the output signal are detectable by the period counter.

DESCRIPTION OF THE DRAWINGS

A full understanding will be obtained from a detailed description given hereinbelow and the accompanying drawings. In addition, the drawings are given by way of illustration only and are not limitative of the present invention. Further, wherein:

FIG. 1 is a block diagram of the apparatus for measuring the resonant frequency of a resonator as embodied in the present invention.

FIG. 2 is a block diagram of the apparatus of the present invention for measuring the resonant frequency of a selected one of a cascade arrangement of variable bandwidth filters.

DESCRIPTION OF THE PREFERRED EMBODIMENT

Referring to FIG. 1, there is shown a block diagram of the present invention. That circuit consists of a continuous wave signal generator 10 acting as an energy source coupled to one terminal of a switch 20. Following switch 20 and connected to the other terminal thereof is a resonator 30 (e.g., an RLC or crystal resonator), the center frequency of which is to be measured. The out terminal of the resonator is coupled to the input terminal of a period counter 50, either directly or via a limiting amplifier 40. In addition, period counter 50 receives a high frequency reference signal from signal generator 60. The period of the reference signal from source 60 defines the minimum unit of time measurable by the period counter 50.

From the design specification of the resonator and the known tolerances of its component parts, or the crystal itself, the expected resonance or center frequency of the resonator can be calculated. Based on the expected value of the center frequency of the resonator, the output frequency of signal generator 10 is selected to be close to, but not exactly the same as, the expected center frequency of resonator 30. For example, for a 4 MHz resonator with a very high Q the frequency selected for signal generator 10 may be on the order of 100 Hz above or below 4 MHz, whereas for a lower Q resonators the selected frequency may be several thousand Hertz above or below 4 MHz. Initially, switch 20 is closed and several cycles from signal generator 10 are applied to resonator 30 to charge it. Once the desired number of cycles have been applied to resonator 30, switch 20 is opened under the control of period counter 50.

At this time resonator 30 will begin to oscillate, or ring down, exponentially. As resonator 30 dissipates the energy previously stored in it, period counter 50 measures its resonant frequency by counting the period of oscillation.

As the resonator output signal waveform decays, the amplitude loss in decibels for each cycle of that waveform may be determined by the equation:

$$A_{db} = 10 \log (1 + 2\pi/Q)^N, \tag{1}$$

where N is the resonator output signal waveform cycle number and Q is that of the resonator. From equation (1) it can be seen that if the Q of the resonator is very large, the loss in amplitude will be small over many cycles of oscillation. For smaller values of Q, the amplitude exponentially decays at a higher rate and may diminish beyond measurability before accurate readings may be obtained. For these situations the inclusion of limiting amplifier 40 will boost the small amplitude signals to levels detectable by period counter 50 to further enhance performance of this method. Limiting amplifier 50 could have a logarithmic response to provide greater and greater amplification as the output signal from the resonator decays.

Referring now to FIG. 2, there is shown an implementation of the present invention for measuring the resonant frequency of a specific variable bandwidth filter in a cascade arrangaement of said devices. The measurement principle involved is identical to that discussed above with one variation. Before the measurement is begun, the filters other than the one of interest must be made transparent. This is accomplished by detuning, or widening the bandwidths of, those filters not of interest. The resonant frequency of the filter of interest will then pass freely or be affected as little as possible. The advantage of this process is that it may be repeated to measure the center frequency of each of the cascaded filters in turn without having to disturb the circuit wiring and thus the effects of the stray circuit components are included in the measurements.

To illustrate the ability of this method to obtain a high degree of accuracy in a very short period of time, let's reexamine equation (1). If we arbitrarily, choose a resonator with a resonant frequency of 4 MHz, a period counter reference frequency of 100 MHz, and a measurement resolution of ±1 Hz, 4,000,000 cycles of the 100 MHz reference need to be counted which will take 40 milliseconds. In that 40 milliseconds, the 4 MHz resonator will oscillate through 160,000 cycles (N=160,000). Thus, if Q is around 200,000, the amplitude of the resonator output signal will drop only by about 20 dB. This example clearly demonstrates the resolution to 1 Hz is possible in as little as 40 milliseconds.

While this invention as been described in terms of one preferred embodiment, it is contemplated that persons reading the preceding descriptions and studying the drawings will realize various alterations, permutations and modifications thereof. It is thereofre intended that the following appended claims be interpreted as including all such alterations, permutations and modifications as fall within the true spirit and scope of the present invention.

What is claimed is:

1. A circuit for accurately measuring the resonant frequency of a resonator, said circuit comprising:
   terminal means for receiving a drive signal the frequency of which is offset from the expected resonant frequency;
   gate means for distributing said drive signal to the resonator for a preselected period of time and then decoupling it therefrom; and
   period counter means for counting the period of the signal from the resonator after the gate means has decoupled the drive signal from the resonator.

2. A circuit as in claim 1 further including amplifier means to receive the output signal from the resonator and to amplify said output signal before it is applied to the period counter means to increase the number of periods of that output signal that fall within the dynamic range of the period counter means and are therefore detectable by the period counter means.

3. A circuit as in claim 1 wherein said period counter means includes a reference signal means for generating a reference signal having a period that is substantially shorter than the expected resonant period of the resonator, for defining the minimum increment of time determinable by the period counter means.

4. A circuit as in claim 1 wherein the period counter means produces a control signal after a preselected period of time for decoupling the drive signal from the resonator and thereby allowing the resonator to ring down.

5. A circuit as in claim 4 wherein the gate means includes a terminal means for receiving said control signal.

6. A circuit as in claim 1 wherein the period counter means also inverts the measured period of the resonator output signal to determine the resonant frequency of the resonator.

7. A method for accurately measuring the resonant frequency of a resonator, said method comprising the steps of:
   generating a drive signal for supplying energy to a resonator at a frequency offset from the expected resonant frequency of said resonator;
   applying said drive signal to the resonator for a preselected period of time; and
   measuring the period of the resonator output signal as it rings down after the completion of the drive signal applying step.

8. A method as in claim 7 further includes the step of amplifying the resonator output signal prior to the measuring step to increase the number of periods of that signal that are detectable.

9. A method as in claim 7 wherein the measuring step utilizes a reference signal having a period that is substantially shorter than the expected resonant period of the resonant for defining the minimum increment of time determinable.

10. A method as in claim 7 wherein the measuring step includes the step of selecting the length of time during which the drive signal is applied to the resonator.

11. A method as in claim 7 wherein the measuring step includes the step of inverting the measured period of the resonator to determine the resonant frequency thereof.

12. A method as in claim 7 wherein:
   the resonator is a cascade of a plurality of variable bandwidth filters; and
   said method further includes the step of detuning all of the filters with the exception of the filter of interest before performing the other steps of the method.

* * * * *